United States Patent [19]

Clark

[11] Patent Number: 4,508,296

[45] Date of Patent: Apr. 2, 1985

[54] HEMISPHERICAL LATCHING APPARATUS

[75] Inventor: Keith H. Clark, Decatur, Ala.

[73] Assignee: The United States of America as represented by the Administrator of the National Aeronautics and Space Administration, Washington, D.C.

[21] Appl. No.: 401,282

[22] Filed: Jul. 23, 1982

[51] Int. Cl.³ .................. B60P 7/08; B61D 45/00; B64G 1/00
[52] U.S. Cl. .................. 244/158 R; 244/118.1; 248/503; 248/555; 403/56; 403/76; 403/90; 403/143; 410/79; 410/90
[58] Field of Search .................. 244/158 R, 160, 161, 244/118.1; 248/555, 556, 503; 403/56, 76, 90, 122, 141, 142, 143; 410/68, 69, 78, 90, 79

[56] References Cited

U.S. PATENT DOCUMENTS

| | | | |
|---|---|---|---|
| 1,245,676 | 11/1917 | Cadman | 403/143 X |
| 2,260,995 | 10/1941 | Kruczek | 403/90 |
| 3,547,375 | 12/1970 | Mackey | 244/161 X |
| 3,815,849 | 6/1974 | Meston | 244/160 |
| 4,131,256 | 12/1978 | F'Geppert | 403/90 X |
| 4,290,570 | 9/1981 | Smolik et al. | 244/118.1 X |
| 4,345,861 | 8/1982 | Aarseth | 410/68 |

Primary Examiner—Robert B. Reeves
Assistant Examiner—Howard Beltran
Attorney, Agent, or Firm—Joseph H. Beumer; John R. Manning; Leon D. Wofford, Jr.

[57] ABSTRACT

A payload retention system for securing and retaining a payload in a fixed docked position on a platform in a cargo bay of a space vehicle is disclosed which includes a plurality of latching assemblies 16 carried by platform 10 each of which includes a latching member A having a contoured spherical latch element 24. A plurality of payload latching elements B are carried by the payload having a complementary contoured spherical latch element 18. The latching elements 18 are carried in interlatching alignment with the latching members 24 of the latching assemblies 16 defining latch couplings C. Spherical latch element 18 has a convex latching surface 19 and spherical element 24 has a concave latching surface 25 which mate and couple with one another when interlatched. The spherical latch elements 18, 24 having their axes aligned with one another when interlatched whereby the payload is retained in a fixed docked position. The spherical latch elements allow free rotation about their coupling axis 80 while limiting movement along these axes.

9 Claims, 7 Drawing Figures

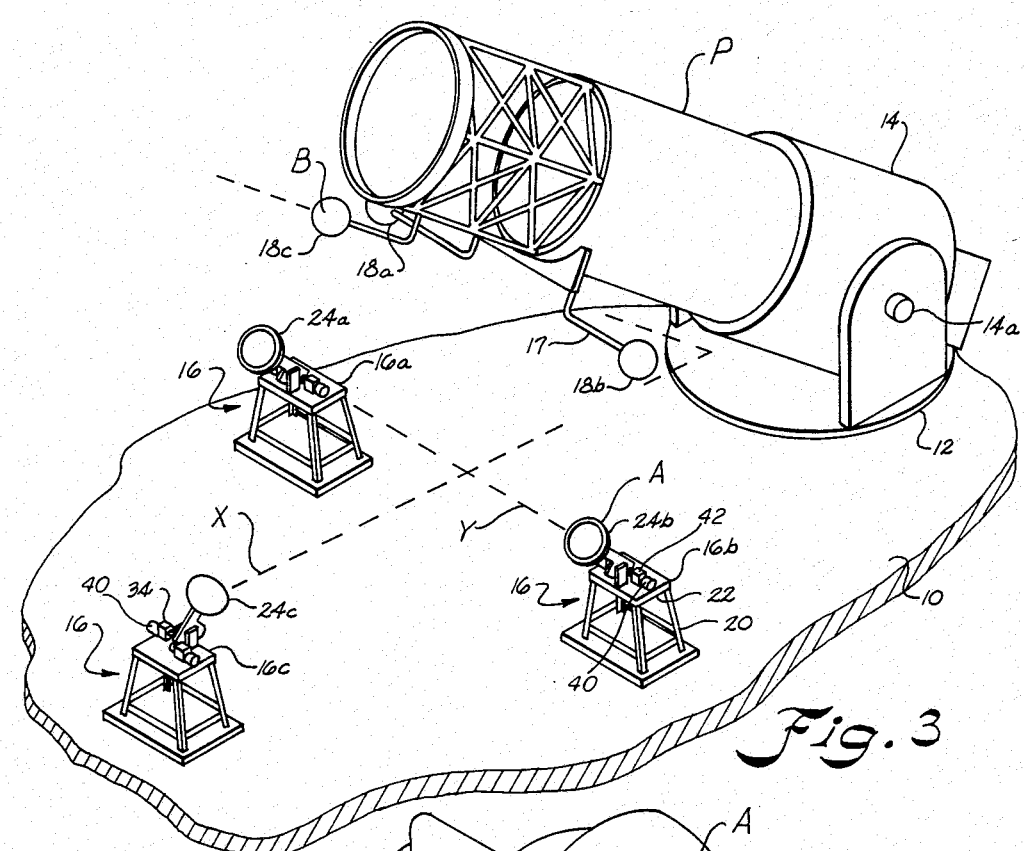
Fig. 3
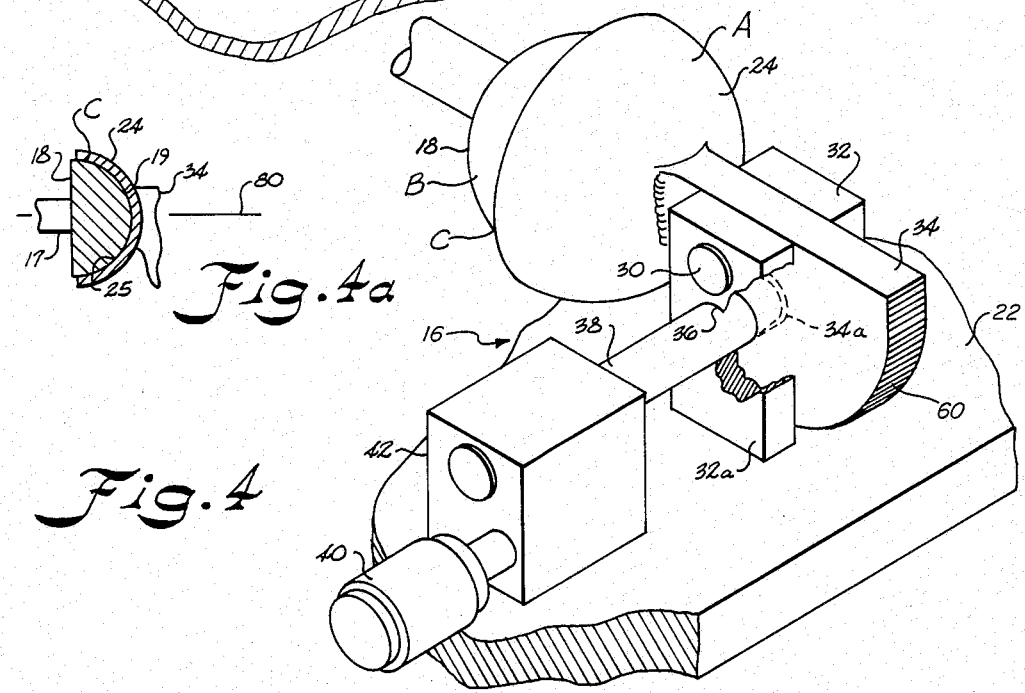
Fig. 4a
Fig. 4

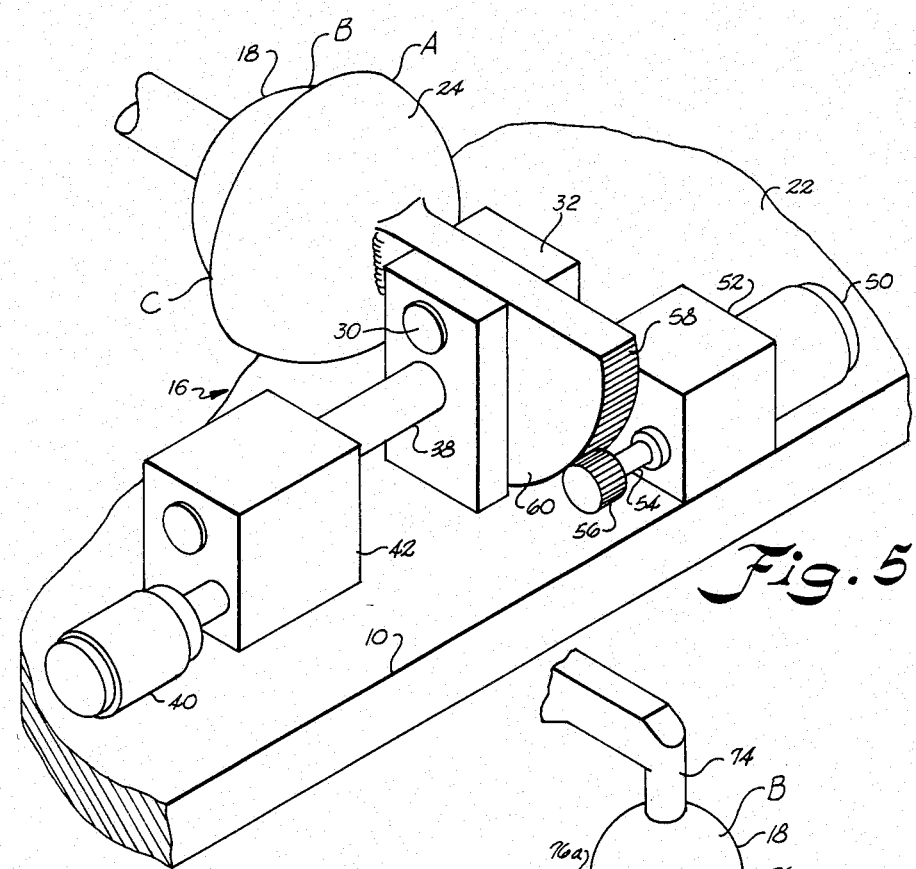
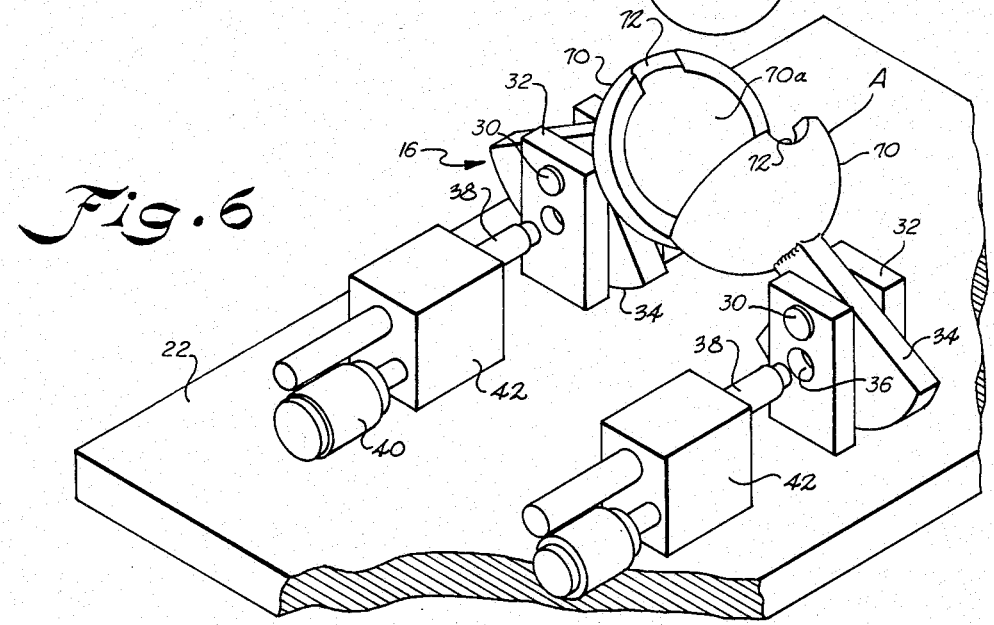

HEMISPHERICAL LATCHING APPARATUS

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

In many space program applications, it is desirable to secure a payload in the cargo bay of a space vehicle, such as a space shuttle vehicle, to perform certain programs in space. It is desirable to provide a system for securing a wide range of payload sizes and shapes which may weigh upwards to several tons and require large volumes.

Several actuator assemblies have been proposed for utilization in the space program securing payloads in the cargo bays of space vehicles. However, most of these have involved very complex and heavy arrangements which utilize a large number of moving parts involving hinged linkages and arm assemblies for gripping the payload. In such arrangements the reliability is adversely affected by the large number of moving parts and the complexity of the systems. In addition, the cost is very high due to the complicated arrangements and the redundancy which is required due to the necessity of having motors to drive the numerous linkages and gripping arms. A backup motor is required in case a primary motor fails.

U.S. Pat. No. 4,290,570 discloses a system of ball lock mechanisms which mount a spacecraft cradle in the payload bay of a space shuttle vehicle. U.S. Pat. No. 3,815,949 discloses apparatus for locking the forward and rear ends of a container within he cargo bay of a space shuttle. However, these systems are not suitable for gimbal supported payloads which need be locked in and out of pivoted positions in the cargo bay.

Accordingly, an important object of the present invention is to provide a system for retaining a payload in the cargo bay of a space vehicle in a fixed configuration which is simple, lightweight and reliable.

Another important object of the present invention is to provide apparatus for latching and retaining a payload in the cargo bay of a space vehicle when the payload is gimballed in and out of pivoted positions in the bay.

Still another important object of the present invention is to provide a system for retaining a payload in the cargo bay of a space vehicle does not require redundancy in that the latching machanisms may be passive and need not be driven to latch the payload in a retaining position.

SUMMARY OF THE INVENTION

The above objectives are accomplished according to the present invention by providing a retention system carried in a cargo bay which includes a plurality of complimentary spherical latching elements which automatically align and engage with one another when the payload is moved into a docked payload position in the bay. When retained in the payload docked position the axes of the spherical latching elements may be locked by simple means such as by utilizing a pin placed through a locking plate holding the members in their position. The system may be operated passively wherein the latching elements carried on the payload and complimentary latching elements carried in the cargo bay are self-aligned and are brought into a locking position by engagement only. In a preferred embodiment, the spherical latch elements are hemispherical in shape.

BRIEF DESCRIPTION OF THE DRAWINGS

The constuction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 3 is a perspective view with parts cut away illustrating a payload retention system constructed according to the present invention in a cargo bay of a space vehicle;

FIG. 4 is a perspective view illustrating a hemispherical latching assembly constructed according to the present invention for retaining a payload in a cargo bay of a space vehicle;

FIG. 4a is a section view illustrating a concave and convex latching surface engaged and axially coupled with one another according to the invention;

FIG. 5 is a perspective view of a driven spherical latching assembly constructed according to the present invention for securing a payload in a cargo bay of a space vehicle; and FIG. 6 is a perspective view illustrating an alternate embodiment of a spherical latching assembly constructed according to the present invention.

DESCRIPTION OF A PREFERRED EMBODIMENT

A payload retention system for securing and retaining a payload P in a fixed docked position on a platform 10 in a cargo bay of a space vehicle includes a plurality of latching members A which include a contoured spherical latch element. A plurality of platform latching assemblies are carried by the platform each of which includes one of the latching members A. A plurality of payload latching elements B are carried by the payload which include complimentary spherical latch elements. The spherical platform and payload latch elements are carried in interlatching alignment with each other defining latch couplings C aligned along axes of the payload. One of the spherical latch elements has a convex latching surface and the other spherical element has a concave latching surface. The concave and convex latching surfaces mate and couple with one another in an interlatching alignment. The spherical latch elements have their axes aligned with one another when coupled in interlatching alignment whereby the payload is retained in the fixed docked position with movement limited along the axes. The spherical latch elements are arranged on the platform 10 and payload P so that engagement and axial coupling of the spherical elements of one of the latch couplings C due to movement of the payload to said docked position, gradually forces alignment of the axes and coupling of the spherical latch elements of the remaining latch couplings C.

Figure 2:
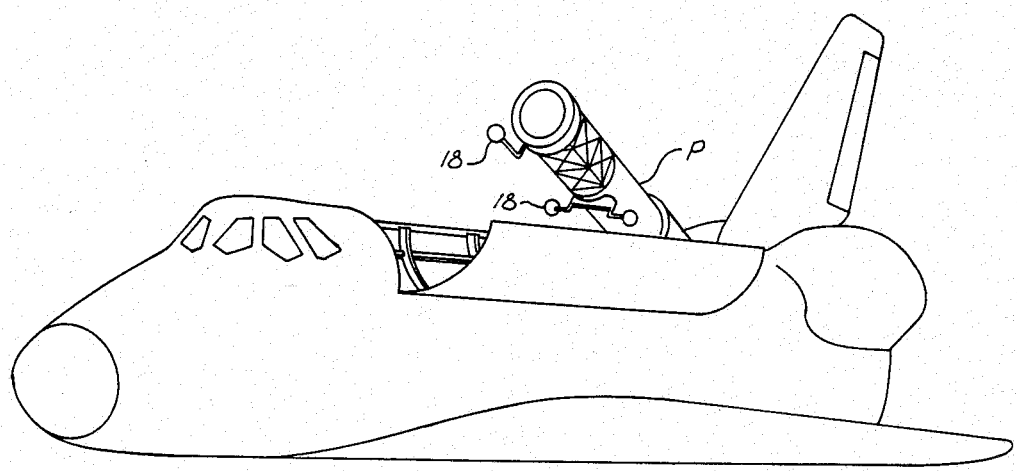
FIG. 2 is an elevation illustrating a payload when raised to an operational position in a cargo bay with the retention system according to the invention released.

Referring now in more detail to the drawings, the payload P is carried on platform 10 by an attitude gimbal system 12 which may be a conventional gimbal system for pointing and orienting a payload in a desired orientation in space as is commonly used in space vehicle and platform maneuvers in space. The attitude gimbal system is a conventional mechanical system for pivoting and moving the payload P in a supported position by a connecting member 14 attached to the payload and gimbal support as controlled from a remote location. In the raised position of FIG. 2, a hatch of the vehicle is opened and the payload is oriented in a desired position in space to perform an operation in i.e., signal transmission, camera observation, etc.

As illustrated, the payload retention system according to the present invention includes a plurality of latching assemblies designated generally as 16 arranged on a platform 10 of a carbo bay of a space shuttle type vehicle 19. Assemblies 16a and 16b are laterally spaced and arranged on the sides of payload P in orthogonal alignment with the axis X of assembly 16c arranged at the front and along the longitudinal axis of payload P. Assemblies 16a and 16b lie on an axis Y perpendicular to axis X. The assemblies may be fixed to platform 10 in any suitable manner such as bolts. Each latching assembly pivotably carries a latching member A. Since each of the latching assemblies 16 may be identical, a description of only one of the latching assemblies will be made in detail herein.

Latching elements B are carried by payload P which latch with latching members A of assemblies 16. As illustrated latching elements B include a plurality of spherical latch elements 18a, 18b, and 18c carried by the payload on each side thereof and at the front in latching alignment with respective latching assemblies 16a, 16b, and 16c. The spherical latching elements include a convex latching surface 19 which are prefereably provided by either a solid or hollow hemispherical body. In practice, it will be desirable to make the members 18 hollow and hemispherical in shape (FIG. 4a) for weight reduction which is important in space applications. However, elements 18 may be any spherical shape such as a whole sphere, hemisphere, of another sphere segment.

Each latching assembly 16 includes a frame 20 by which the assembly may be supported on the platform 10 and secured by any suitable fastener such as bolts 21. Each frame includes a top plate 22 on which latching members A are supported. The latching members include spherical latching elements 24 pivotably carried on the frame 20 by a pivot-pin connection 30 carried on the top plate 22. The pivot 30 is carried by a pair of standards 32 secured such as by welding to top plate 22. A connecting plate 34 is pivotably carried between standards 32 by the pivot pin 30. The latching member 24 is carried by the plate 34 by any suitable attachment such as by welding.

In practice, latching element 24 is a spherical element in the form of a hemisphere having concave latching surface 25 which engages and mates with convex latching surface 19 in a flush manner. Platform latching elements 24a, 24b, 24c form latch couplings C with payload latching elements 18a, 18b, 18c, respectively.

One of the standards 32a FIG. 4 assembly 16 include an opening 36 through which a locking pin 38 may be retracted and extended for locking the plate 34 in a payload retaining position. For this purpose, a corresponding opening 34a may be formed in the plate 34 for receiving the pin when extended through the opening 36 to lock the plate in the retaining position shown in FIG. 4.

A remote controlled electric motor 40 is carried on a gear reduction box 42 for retracting and inserting the lock pin 38. For this purpose, gear box 42 may include suitable reduction gearing such as a worm gear as is well within the purview of one skilled in the art. The motor 40 may be controlled from a remote location by any conventional control. The gear reduction box 42 is also affixed and carried on the top plate 20 of each hemispherical latch assembly.

When the payload is raised and undocked, the latching members A are automatically left in a position for relatching and redocking of the payload in the bay by the retention system. This occurs automatically as the payload is lowered and latching elements B gradually engage the concave surface 25 of latching members to self align and latch therewith.

The system as described above may be passive or active. FIG. 5 illustrates an active system arrangement which includes a drive motor 50 coupled to a gear reduction box 52 carried on the plate 22. An output shaft 54 extending from the gear reduction box 52 includes a drive gear 56 which meshes with gear teeth 58 formed on a back surface of plate 60 which carries concave latching member 24. Latching member 24 is driven to interlock with the members 18 on the payload instead of being passively aligned and latched therewith. Motor 50 may be remotely controlled by conventional controls.

Figure 1:
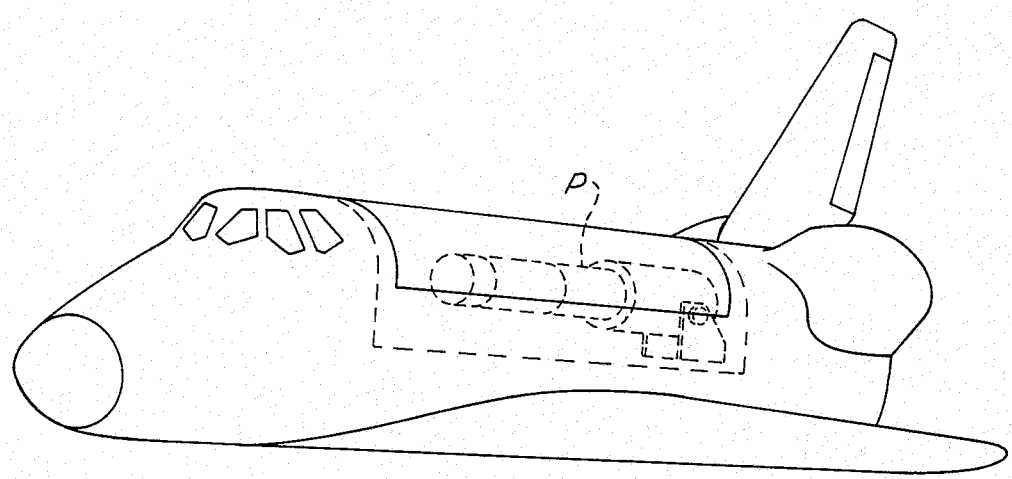
FIG. 1 is an elevation view illustrating a payload being secured in a cargo bay of a space vehicle by means of a payload retention system constructed according to the present invention.

In operation, when utilized as a passive system, the attitude gimbal system 12 raises the payload from its stored, retained position which will automatically release the complimentary latching members A and B from locking engagement with one another. After the payload had been lifted from its retained position and utilized in its operational position during the desired experimentation mode, the attitude gimbal system will return the payload P back to its position for retention in the cargo bay. When this occurs, the convex surfaces 18a of the hemispherical latching elements 18 and the concave surfaces 25 of the complimentary latching members 24 will gradually engage one another in a self-aligning manner until they interlock with one another in the payload retention position (FIG. 1). The locking pins 38 may then be inserted into the plates 34 for locking the hemispherical latching members in the retention position.

The hemispherical members provide a good load distribution over the concave and convex surfaces 25 and 19 which bear the load uniformly so that heat is distributed evenly over the surfaces during and after the payload is locked in the retention position. In the prior trunion and clamping members, the loads are concentrated on the connecting trunions which can result in heat and uneven load distributions on the payload connecting portions. In the hemispherical locking members the load is distributed over one hundred and eighty degrees of curved surface area.

FIG. 6 represents another embodiment of the invention wherein the complimentary latching elements 18 are spherical and each latching member includes a pair of hemispherical members 70 having concave latching surfaces 70a. A notch 72 is formed in each member to receive an arm 74 having a ball latching member 76 affixed thereon which includes a convex latching surface 76a. As the ball descends into the open hemispherical member 70, gradual engagement of the members causes the half members 70 to close about the ball latch member 76 and provide payload retention. The remaining system is the same as described before. Pins 38 may then be locked in plates 34. To open, pins 38 are retracted and gimballing of the payload upwards disengages ball latch member 76 from the hemispherical latching members 70.

It will be noted that the concave latching members 24, 70 will be in alignment for engagement by convex latching member 18, 76 when released. In the passive system, it may be desirable to maintain concave latching members in this release position insuring re-engagement with convex latching members 18, 76 when the payload is again returned to the cargo bay for retention. An arrangement may be provided to maintain members 18, 76 in this position. One arrangement would be a friction fit in the pivot connection 30 so that plate 34 does not rotate freely so as to cause it to move from this position after release. Counter-balancing spring arrangements may also be utilized as is well within the skill of one in the art.

While a preferred embodiment of the invention has been described using specific terms, such description is for illustrative purposes only, and it is to be understood that changes and variations may be made without departing from the spirit or scope of the following claims.

What is claimed is:

1. A payload retention system for securing and retaining a gimballed payload in a fixed docked position on a platform in a cargo bay of a space vehicle for flight in outer space which payload is shiftable to an extended position comprising:
   a plurality of latching members;
   a plurality of latching assemblies carried by said platform each of said latching assemblies including one of said latching members;
   a plurality of payload latching elements carried by said payload;
   a first of said latching elements being carried in interlatching alignment with a first latching member of a first of said latching assemblies defining a first latch coupling along a first coupling axis;
   a second of said payload latching elements being carried in interlatching alignment with a second latching member of a second of said latching assemblies defining a second latch coupling along a second coupling axis;
   a third of said payload latching elements being carried in interlatching alignment with a third latching member of a third of said latching assemblies defining a third latch coupling along a third coupling axis;
   each said latch member including a contoured spherical latch element;
   each said payload latching element including a complementary contoured spherical payload latch element;
   one said spherical latch elements having a convex latching surface and the other of said spherical elements having a concave latching surface, said concave and convex latching surfaces mating and coupling with one another along a respective coupling axis in said interlatching alignment;
   said spherical latch elements having their axes aligned with one another when coupled in said interlatching alignment wherein said payload is retained in said fixed docked position;
   said spherical latch elements allowing free rotation about their respective coupling axis while limiting movement along the axes;
   said spherical latch elements being arranged on said platform and payload so that engagement and axial coupling of the spherical elements of one of said latch couplings due to movement of said payload to said storage position gradually forces alignment of the coupling axes and coupling of the spherical latch elements of the remaining latch couplings and
   said first latch member exerting a latching force on said first latch coupling opposing the latching forces exerted by said second and third latch members of said second and third latch couplings so that said payload is retained in said storage position.

2. The system of claim 1 wherein said first latching member and said first latching element are axially aligned along a first axis of said payload, said second and third latching members and elements being carried in axial alignment along a second axis of said payload whereby said axial latching of a latch coupling along one payload axis causes axial latching in the remaining latch couplings.

3. The system of claim 1 including pivotal attachment means pivotally carrying said latching members on said platform so that unlatching of said convex and concave latching surfaces pivots the latching members of said latching assemblies automatically in a position for latching and redocking of said payload in said docked position.

4. The system of claim 1 wherein said spherical elements are hemispherically shaped elements.

5. The system of claim 1 including lock means locking said latching members and latching elements in said interlatching alignment.

6. The system of claim 1 including drive means operatively connected to said latching members for moving said latching members in and out of said interlatching alignment.

7. A payload retention system for securing and retaining a gimballed payload in a fixed storage position on a platform in a cargo bay of a space vehicle which payload is shiftable to an extended position comprising:
   a plurality of latching members;
   a plurality of latching assemblies carried by said platform each of which includes one of said latching members;
   a first of said latching assemblies carried along a first coupling axis of said payload;
   a second of said latching assemblies carried by said platform along a second coupling axis and laterally spaced from said first axis;
   a third of said latching assemblies carried by said platform along a third coupling axis and spaced from said first axis on a side thereof opposite said second latching assembly;
   a plurality of latching elements carried by said payload;
   a first of said latching elements being carried in interlatching alignment with a latching member of a first of said latching assemblies to provide a first latch coupling along said first coupling axis;
   a second of said latching elements being in interlatching alignment with a latching member of a second of said latching assemblies to provide a second latch coupling along said second coupling axis;

a third of said latching elements being in interlatching alignment with a latching member of a third of said latching assemblies to provide a third latch coupling along said third coupling axis;

each said latching member including a contoured latching surface;

each said latching element including a contoured latching surface engaging and mating with said contoured latching surface of said latching member such that said contoured surfaces gradually force self-alignment with one another to bring each said latch coupling into said interlatching alignment securing said payload in a docked position;

said first latching member and said first latching element being carried with said first coupling axis in axial alignment with a first payload axis, said second and third latching members and said first and second latching elements having their said respective coupling axes in alignment with said first payload axis while being arranged along a laterally offset second payload axis so that latching along the coupling axis of one latch coupling gradually causes axial latching of the remaining latch couplings; and said first latch coupling exerting an opposite latching force against said first payload latching element along said first coupling axis than said second and third latch couplings exert on said second and third payload latching elements thereby fixing and retaining said payload.

8. The system of claim 7 wherein said contoured latching surface of said latching member includes a spherical element and said contoured latching surface of said latching element includes a complimentary shaped spherical element.

9. The system of claim 7 wherein said contoured surface of said spherical element is convex and said contoured surface of complimentary shaped spherical element is concave, said convex and concave surfaces having equal curvature for flush mating and couplin together.

* * * * *